US010818035B1

(12) United States Patent
Guo et al.

(10) Patent No.: US 10,818,035 B1
(45) Date of Patent: Oct. 27, 2020

(54) REPRESENTING VANISHING POINTS USING RELATIVE DISTANCES

(71) Applicant: Baidu USA LLC, Sunnyvale, CA (US)

(72) Inventors: Yuliang Guo, Sunnyvale, CA (US); Tae Eun Choe, Sunnyvale, CA (US); Ka Wai Tsoi, Sunnyvale, CA (US); Guang Chen, Sunnyvale, CA (US); Weide Zhang, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 0 days.

(21) Appl. No.: 16/457,572

(22) Filed: Jun. 28, 2019

(51) Int. Cl.
*G06T 7/80* (2017.01)
*G06N 3/08* (2006.01)
*G06T 7/536* (2017.01)
*G06K 9/00* (2006.01)

(52) U.S. Cl.
CPC ............ *G06T 7/80* (2017.01); *G06K 9/00798* (2013.01); *G06N 3/08* (2013.01); *G06T 7/536* (2017.01); *G06T 2207/30256* (2013.01)

(58) Field of Classification Search
CPC . G06T 7/80; G06T 7/536; G06T 2207/30256; G06K 9/00798; G06N 3/08
See application file for complete search history.

(56) References Cited

U.S. PATENT DOCUMENTS

2015/0049193 A1* 2/2015 Gupta .................... G03B 43/00
348/148
2019/0034740 A1* 1/2019 Kwant ............... G06K 9/00798

* cited by examiner

*Primary Examiner* — Michael E Teitelbaum
(74) *Attorney, Agent, or Firm* — Womble Bond Dickinson (US) LLP

(57) ABSTRACT

In some implementations, a method is provided. The method includes obtaining an image depicting an environment where an autonomous driving vehicle (ADV) is located. The method also includes determining a vanishing point within the image using a neural network. The vanishing point is represented by the neural network as a relative distance to a center of the image. The method further includes calibrating one or more sensors of the autonomous driving vehicle based on the vanishing point.

18 Claims, 14 Drawing Sheets

REPRESENTING VANISHING POINTS USING RELATIVE DISTANCES

RELATED APPLICATIONS

This application is related to U.S. patent application Ser. Nos. 16/457,557 and 16/457,604, both filed Jun. 28, 2019.

TECHNICAL FIELD

Embodiments of the present disclosure relate generally to operating autonomous vehicles. More particularly, embodiments of the disclosure relate to representing vanishing points using relative distances.

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. A path describes the geometric shape of the movement for autonomous vehicles. Various factors affect the desirability of any given path, including those relating to passenger comfort and safety.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Some embodiments relate to a method, apparatus, and system for generating training data and/or training neural networks for autonomous driving vehicle (ADV). A neural network may be used to detect a vanishing point in an image. The vanishing point may be used to determine whether a sensor of the ADV (e.g., a camera) should be recalibrated. The vanishing points in the training data should be accurate to allow the neural network to generate more accurate results. However, it may be difficult a user to both determine and/or precisely indicate where a vanishing point is in a training image. Thus it may be useful to indicate vanishing points in images more precisely and/or accurately.

Some embodiments also relate to training neural networks. For example, a neural network may be trained to indicate the location of a vanishing point within an image. A neural network may generally represent the location of the vanishing point as an X-Y coordinate. However, if an X-Y coordinate is used, this may increase the problem and/or solution space that the neural network may process when determining vanishing points. Thus, it may be useful and/or more efficient to reduce the problem and/or solution space that the neural network may process.

Some embodiments also relate to training neural networks and/or operating neural networks. Neural network may operate independent from each other. For example, a first neural network may operate on input data and a second neural network may also operate on the same input data or separate input data. However, feature maps from the first neural network may be used in the second neural network when both neural networks are operating on the same input data. Thus, it may be useful allow the feature maps generated by the first neural network to be used in the second neural network.

Figure 1:
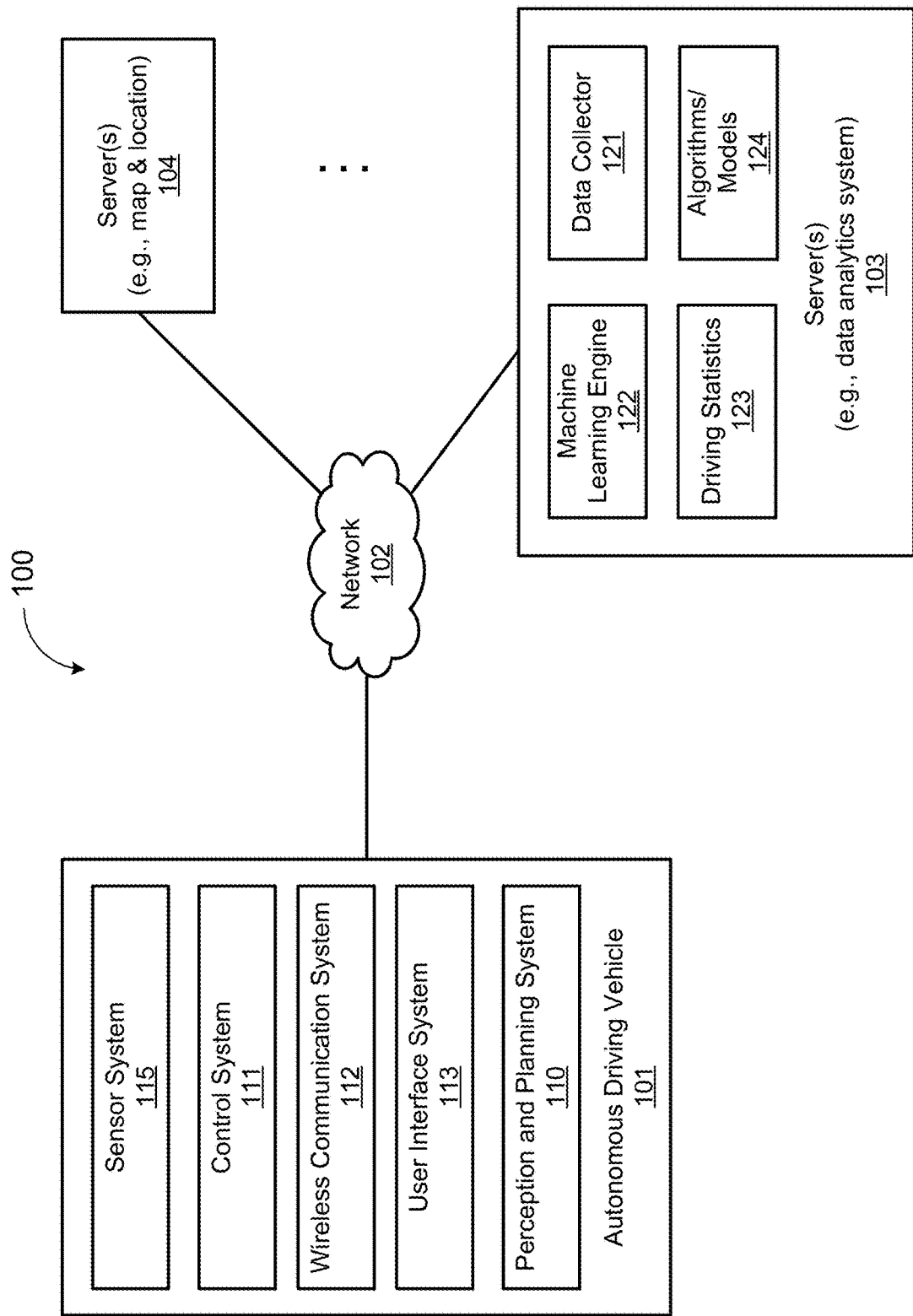
FIG. 1 is a block diagram illustrating a networked system according to one embodiment.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode. Hereinafter the terms "autonomous vehicle" and "autonomous driving vehicle" (ADV) may be used interchangeably.

In one embodiment, autonomous vehicle 101 includes, but is not limited to, perception and planning system 110, vehicle control system 111, wireless communication system 112, user interface system 113, infotainment system, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
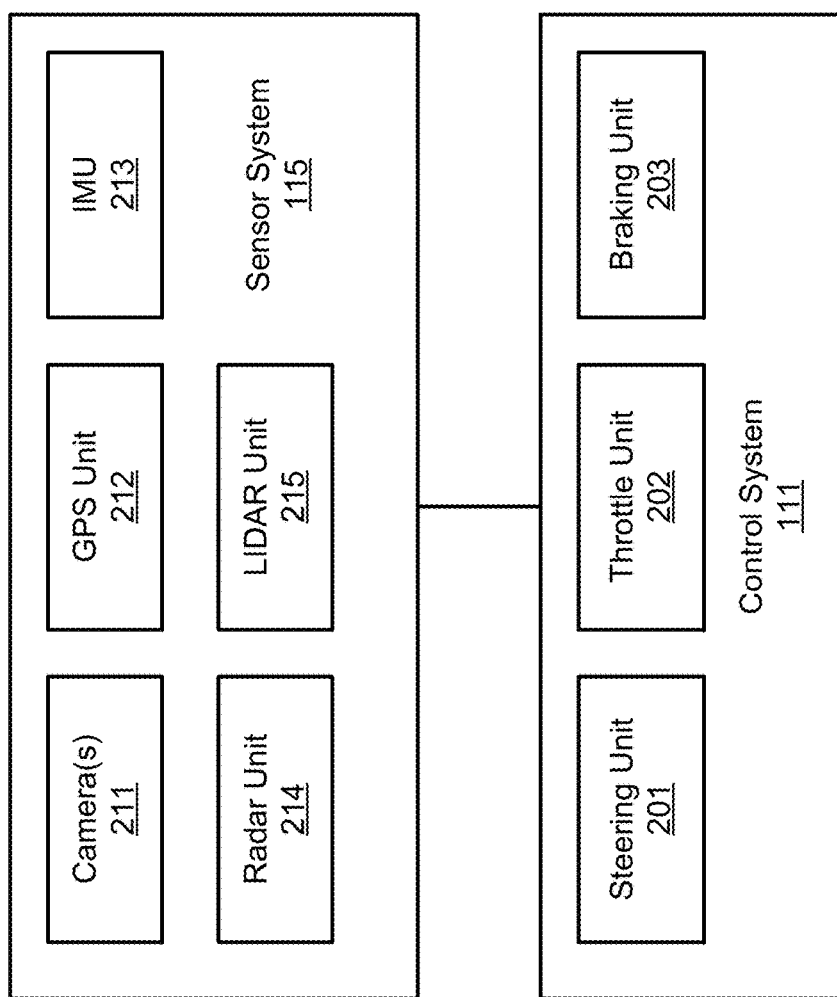
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display device, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110.

While autonomous vehicle 101 is moving along the route, perception and planning system 110 may also obtain real-time traffic information from a traffic information system or server (TIS). Note that servers 103-104 may be operated by a third party entity. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan a path or a route, and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc.

Based on driving statistics 123, machine learning engine 122 generates or trains a set of rules, algorithms, and/or predictive models 124 for a variety of purposes. In one embodiment, algorithms 124 may include an path algorithm that receives inputs, constraints, and a cost function, and generates an path for the ADV, taking into account the comfort level associated with the path as well as the preference for the path to stay close to the lane center line and away from obstacles with a buffer. A cost function for the path planning may also be generated as a part of algorithms 124. Algorithms 124 can then be uploaded on ADVs to be utilized during autonomous driving in real-time.

Figure 3A:
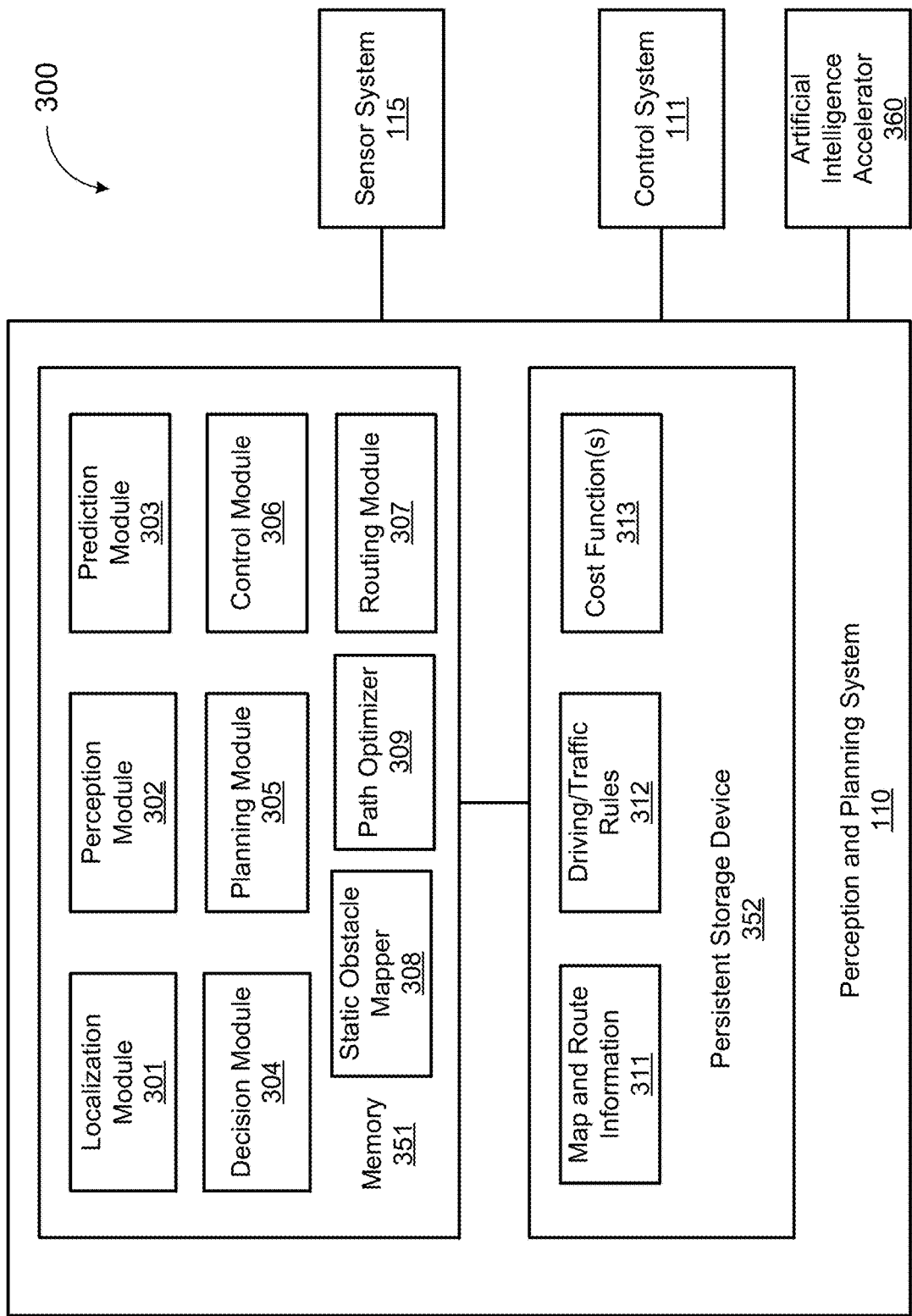
FIGS. 3A-3B are block diagrams illustrating an example of a perception and planning system used with an autonomous vehicle according to one embodiment.
Figure 3B:
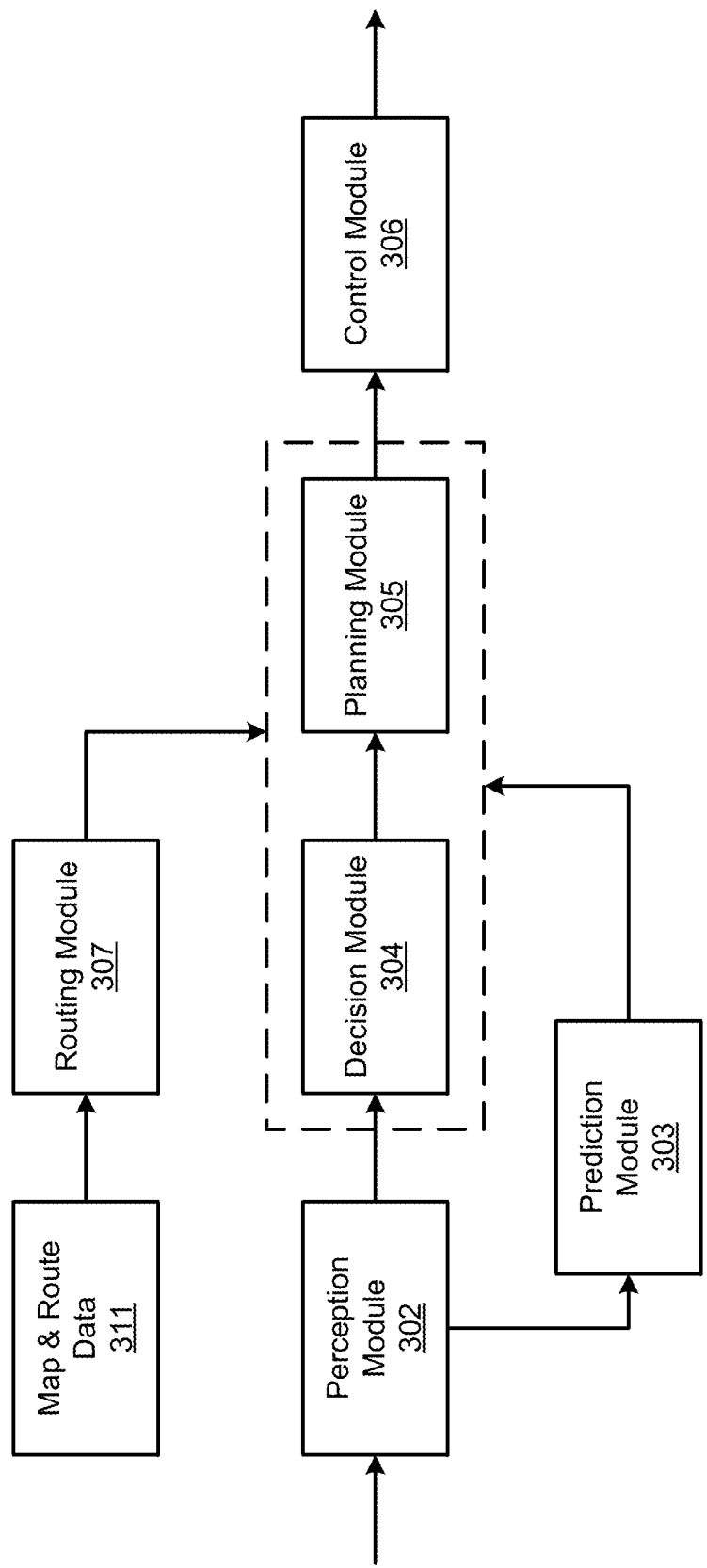

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, static obstacle mapper 308, path planner 309.

Some or all of modules 301-309 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-309 may be integrated together as an integrated module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 mile per hour (mph), then change to a right lane at the speed of 25 mph.

As part of the planning process, the path planner 309 may generate a plurality of planned ADV states based on a cost function 313, which may be stored in persistent storage device 352.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

In one embodiment, paths are planned in an SL-coordinate system. The SL-coordinate system may be defined relative to the reference line (road/lane center line). The longitudinal distance, or s-distance, represents the distance along the tangential direction of the reference line. Correspondingly, the lateral distance, or l-distance, represents the distance perpendicular to the s-direction. The longitudinal dimension in the SL space represents a longitudinal distance of a particular object from a current location of the vehicle that is presumably drives along the reference line. The lateral dimension in the SL space represents the shortest distance between the object and the reference line at a particular time or location represented by the longitudinal dimension. Such a graph in the SL space is referred to as an SL graph. In one embodiment, the lateral distance may be simply defined as the distance from the reference line. Therefore, in addition to representation in the Cartesian coordinate system (XY plane), a vehicle position (pose) may be represented in the SL-coordinate system as an ordered pair (longitudinal pose/position "s-pose", lateral pose/position "l-pose"), or simply (s, l), with respect to a reference line.

In some embodiments, one or more of the components of the perception and planning system 110 may include and/or may use one or more neural networks. For example, the planning module 305 may include and/or may use one or more neural networks to perform various tasks, functions, operations, actions, etc. In another example, the prediction module 303 may include and/or may use one or more neural networks to perform various tasks, functions, operations, actions, etc. In one embodiment, the one or more neural networks that may be included in and/or may be used by one or more components of the perception system may detect lanes (e.g., road lanes) in images that are captured and/or generated by sensors of the ADV. For example, a neural network that is used by the perception module 302 may determine line indicators that may indicate lanes of a road in an image. In another example, a neural network may be used to determine vanishing points in an image. The vanishing points may be used by the sensor system (e.g., sensor system 115 illustrated in FIG. 2) to calibrate one or more sensors (e.g., cameras) of the ADV.

As illustrated in FIG. 3A, the system 300 includes an artificial intelligence (AI) accelerator 360. The AI accelerator 360 may be a processing device that may designed, customized, and/or configured for artificial intelligence applications. For example, the AI accelerator may be used to accelerate the operation of artificial neural networks, to perform machine vision and/or machine learning operations, etc. Examples of AI accelerators may include graphics processing units (GPUs), application specific integrated circuits, field programmable gate arrays, etc.

Figure 4:
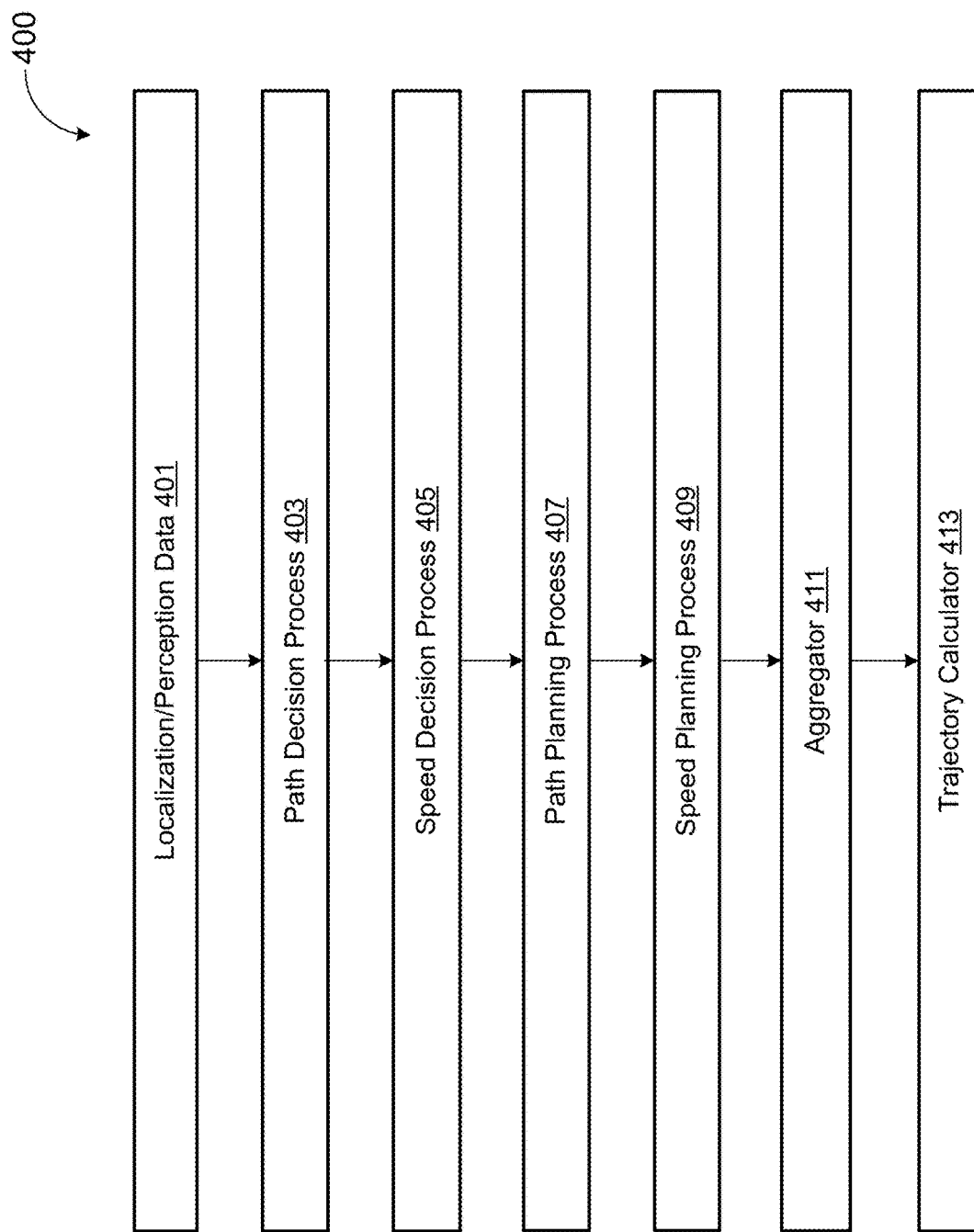
FIG. 4 is a block diagram illustrating an example of a decision and planning process according to one embodiment.

FIG. 4 is a block diagram illustrating an example of a decision and planning process 400 according to one embodiment. Decision and planning process 400 includes localization/perception data 401, path decision process 403, speed decision process 405, path planning process 407, speed planning process 409, aggregator 411, and trajectory calculator 413.

Path decision process 403 and speed decision process 405 may be performed by decision module 304 illustrated in FIG. 3B. Referring to FIG. 3B, the decision module 304 may generate a rough path profile as an initial constraint for the path/speed planning processes 407 and 409 using dynamic programming. The decision module 304 may use a path state machine that provides previous planning results and important information such as whether the ADV is cruising or changing lanes, and traffic rules. From the states, traffic rules, reference line provided by routing module 307, and obstacles perceived by the ADV, path decision process 403 can decide how the perceived obstacles are handled (i.e., ignore, overtake, yield, stop, pass), as part of a rough path profile.

For example, in one embedment, the rough path profile is generated by a cost function consisting of costs based on: a curvature of path and a distance from the reference line and/or reference points to obstacles. Points on the reference line are selected and are moved to the left or right of the reference lines as candidate movements representing path candidates. Each of the candidate movements has an associated cost. The associated costs for candidate movements of one or more points on the reference line can be solved using dynamic programming for an optimal cost sequentially, one point at a time. Dynamic programming (or dynamic optimization) may be a mathematical optimization method that breaks down a problem to be solved into a sequence of value functions, solving each of these value functions just once and storing their solutions. The next time the same value function occurs, the previous computed solution is simply looked up saving computation time instead of re-computing its solution.

Speed decision process 405 may use a speed state machine, speed traffic rules, and one or more station-time graphs. Speed decision process 405 can generate a rough speed profile as an initial constraint for the path/speed planning processes 407 and 409 using dynamic programming. From a state of the speed state machine, speed traffic rules, rough path profile generated by path decision process 403, and perceived obstacles, speed decision process 405 can generate a rough speed profile to control when to speed up and/or slow down the ADV.

Path planning process 407 may use a rough path profile (e.g., a station-lateral map) as the initial constraint to recalculate an optimal reference line using quadratic programming. Quadratic programming involves minimizing or maximizing an objective function (e.g., a quadratic function with several variables) subject to bounds, linear equality, and/or inequality constraints. One difference between dynamic programming and quadratic programming is that quadratic programming optimizes all candidate movements for all points on the reference line at once. The path planning process 407 may apply a smoothing algorithm (such as B-spline or regression) to the output station-lateral map. Path costs may be used to recalculate a reference line with a path cost function to optimize a total cost for candidate movements for reference points, for example, using quadratic programming (QP) optimization.

Speed planning process 409 may use a rough speed profile (e.g., a station-time graph) and one or more S-T graphs to determine one or more speeds for the ADV. In some embodiments, the S-T graph may include an S-T trajectory. An S-T trajectory may indicate the distance travelled by the ADV along the path at different points in time, as discussed in more detail below. Thus, the S-T trajectory (of the S-T graph) maybe used to indicate or determine the speed of the car at different points in time. The S-T graph may also include or indicate one or more stop conditions. For example, the S-T graph may also indicate distances and times at which the ADV should stop to avoid an obstacle, such as a pedestrian, a sidewalk, a roadway divider (e.g., a center divide), another vehicle, etc. Although an ST-graph may be described in FIG. 4, other types of graphs (e.g. SL graphs, graphs that use Cartesian coordinate systems, etc.) may be used in other embodiments. The speed planning process 409 may also use one or more constraints to determine one or more speeds for the ADV. A constraint may be one or more conditions that should be satisfied when the speed planning process 409 determines the set of speeds. For example, a constraint may be a condition imposed on the QP optimization problem which candidate solutions should satisfy. The one or more constraints may be represented using a speed constraint function, as discussed in more detail below.

Aggregator 411 performs the function of aggregating the path and speed planning results. For example, in one embodiment, aggregator 411 can combine the two-dimensional S-T graph and S-L map into a three-dimensional SLT graph. In another embodiment, aggregator 411 can interpolate (or fill in additional points) based on 2 consecutive points on a S-L reference line or S-T curve. In another embodiment, aggregator 411 can translate reference points from (S, L) coordinates to (x, y) coordinates. Trajectory calculator 413 can calculate the final trajectory to control the ADV. For example, based on the SLT graph provided by aggregator 411, trajectory calculator 413 calculates a list of (x, y, T) points indicating at what time should the ADC pass a particular (x, y) coordinate.

Thus, referring back to FIG. 4, path decision process 403 and speed decision process 405 are to generate a rough path profile and a rough speed profile taking into consideration obstacles and/or traffic conditions. Given all the path and speed decisions regarding the obstacles, path planning process 407 and speed planning process 409 are to optimize the rough path profile and the speed profile in view of the obstacles using QP programming to generate an optimal trajectory with minimum path cost and/or speed cost.

Figure 5:
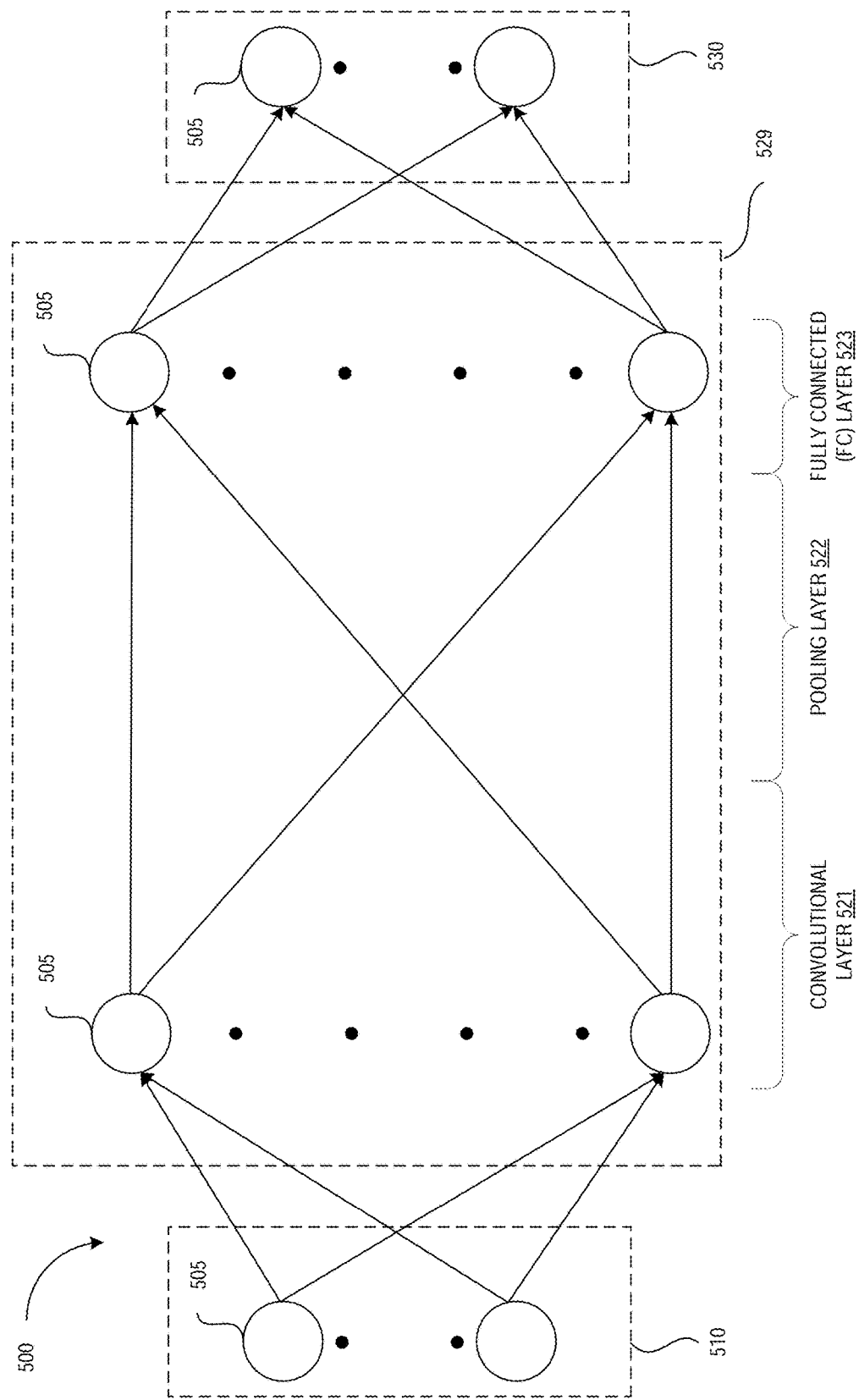
FIG. 5 is a diagram illustrating an example neural network according to one embodiment.

FIG. 5 is a diagram illustrating an example neural network 500, in accordance with one or more embodiments of the present disclosure. The neural network 500 may be used to model relationships between (e.g., complex) inputs and outputs or to find patterns in data, where the dependency between the inputs and the outputs may not be easily ascertained. The neural network 500 may also be a computing model that may be used to determine a feature in input data through various computations. For example, the neural network 500 may determine a feature (e.g., a number, shape, pattern, etc.) in input data (e.g., audio data, image data, video data, etc.) according to a structure that defines a sequence of computations to be performed.

The neural network 500 may be a CNN. A CNN may be a feed forward neural network. A feed forward neural network may be a type of neural network where the connections between the nodes do not form a cycle. For example, the signals, messages, data, information etc., flow forward from the input layer 510 (e.g., from the input nodes), through the hidden layer 529, to the output layer 530 (e.g., to the output nodes) of the neural network 500 from left to right. The signals, messages, data, information etc., may not go backwards through the neural network (e.g., may not go from right to left). A CNN may be used for image analysis. The weights of the connections may take the form of a convolutional filter that may be applied to different pixels of an image. Although the present disclosure may refer to image analysis for CNNs, in other embodiments, the CNN may be used for other types of data and inputs.

The neural network 500 includes an input layer 510, a hidden layer 529, and an output layer 530. Each of the input layer 510, the hidden layer 529, and the output layer 530 includes one or more nodes 505. Each of the input layer 510, the hidden layer 529, and the output layer 530 may have a different number of nodes 505. The neural network 500 may be a deep neural network or a deep CNN. A neural network may be deep if the hidden layer 529 includes multiple levels (e.g., multiple columns of nodes 505, multiple sub-layers of nodes 505). As illustrated in FIG. 5, the neural network 500 includes two levels (or sub-layers) of nodes 505 (e.g., two columns of nodes 505).

Each of the nodes 505 in a layer is connected to either a node 505 in the next level (e.g., next sub-layer) or a node 505 in another layer, as represented by the arrows/lines between the nodes 505. For example, the nodes 505 in the input layer are each coupled to at least one node 505 in the hidden layer 529. Neural network 500 may be a fully connected neural network. For example, each node 505 in each layer or level is connector to each node in the subsequent layer or level where there is a subsequent layer or level (e.g., nodes 505 in the output layer 530 are not connected to other subsequent nodes).

Each connection may be associated with a weight or weight value (e.g., may have a weight). A weight or weight value may define coefficients applied to the computations. For example, the weights or weight values may be scaling factors between two or more nodes 505. Each node 505 may represent a summation of its inputs, and the weight or weight value associated with a connection may represent a coefficient or a scaling factor multiplied to an output of a node 505 in that connection. The weights between the nodes 505 may be determined, calculated, generated, assigned, learned, etc., during a training process for the neural network. For example, backpropagation may be used to set the weights such that the neural network 500 produces expected output values given corresponding values in labeled training data. Thus, the weights of the hidden layers can be considered as an encoding of meaningful patterns in the data. The weights of the connections between the nodes 505 may be modified by additional training.

Although neural network 500 is depicted with a particular number of nodes 505 layers, and connections, various neural network architectures/configurations may be used in other embodiments. For example, different fully connected neural networks and partially connected neural networks (e.g., where all nodes in adjacent layers are not connected) may be used.

As illustrated in FIG. 5, the neural network 500 includes a convolutional layer 521, a pooling layer 522, and a fully connected layer 523. Although one convolutional layer and one pooling layer are illustrated in FIG. 5, additional convolutional layers and pooling layers may be included in the neural network 500 in other embodiments. For example, the neural network 500 may include a first convolutional layer, which may be coupled to a first pooling layer, which may be coupled to a second convolutional layer, which may be coupled to a second pooling layer, which may be coupled to the fully connected layer 523. In addition, the fully connected layer 523 may be optional based on the applications for which the neural network 500 is used.

Although the present disclosure may refer to a convolutional neural network (CNN) other types of neural networks may be used in other embodiments. For example, a recurrent neural network (RNN) may be used in other embodiments.

Figure 6A:
FIG. 6A is a diagram illustrating an example image, according to one embodiment.

FIG. 6A is a diagram illustrating an example image 600, according to one embodiment. The image 600 may depict an environment where vehicles, such as autonomous driving vehicles and non-autonomous vehicles, may be located and/or travelling. For example, the image 600 may depict a roadway, freeway, etc., where an autonomous vehicle may travel through and/or may be located. The image 600 may also depict potential environments where an autonomous vehicle may be located and/or travelling. The image 600 may also depict environments where an autonomous vehicle has previously travelled through or was previously located.

As discussed above, a neural network may be used to analyze images and identify features in images. For example, a neural network may be used to determine and/or identify vanishing points, line or lane indicators, etc. A neural network may be trained prior to deploying and/or using the neural network. For example, training data (e.g., training images) may be used to train a neural network. The training data may include features of interest that were previously identified (e.g., previously identified by a user or a computing device).

Figure 12:
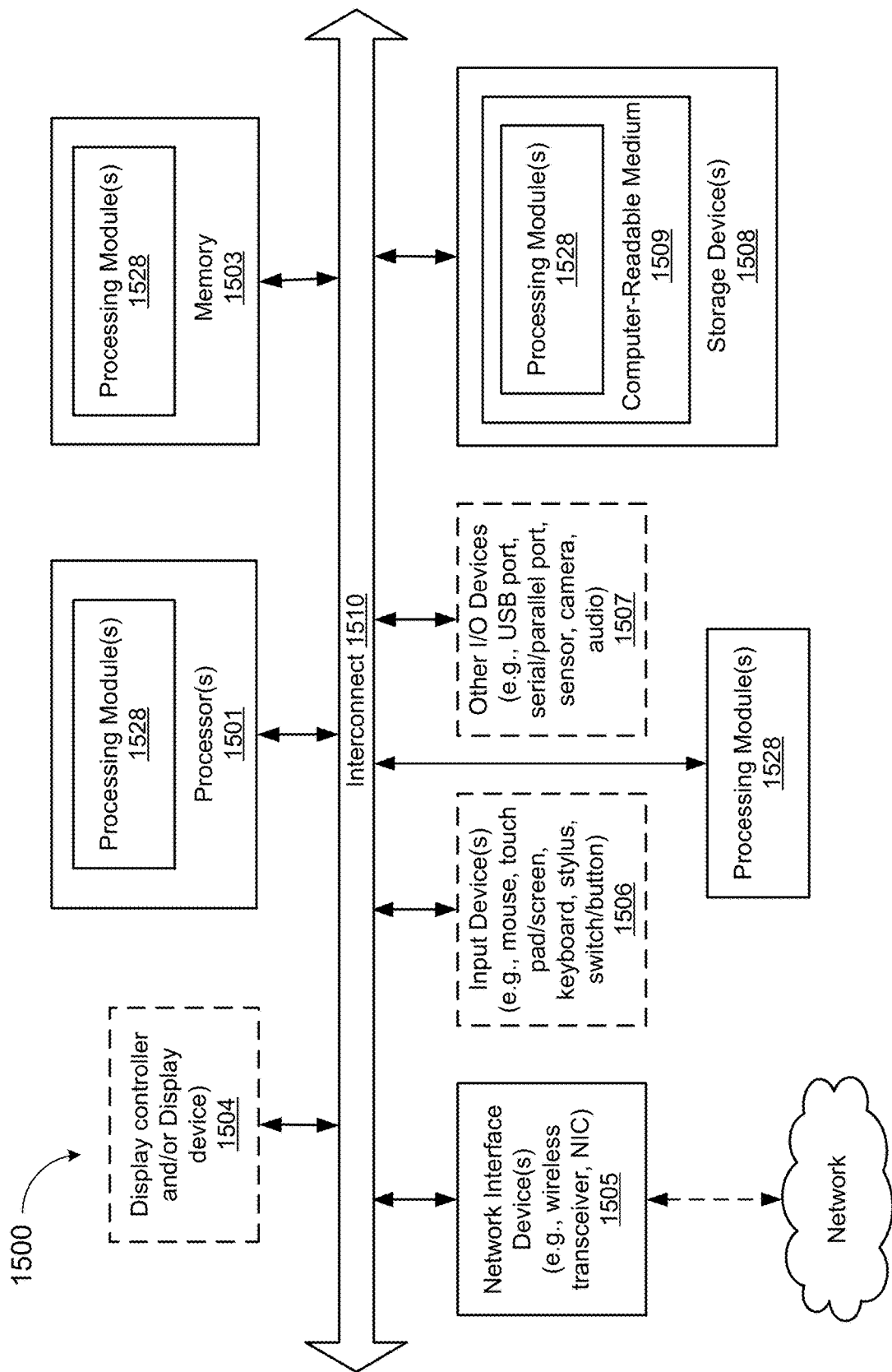
FIG. 12 is a block diagram illustrating a data processing system according to one embodiment.

In one embodiment, a computing device (e.g., a server computer, a laptop computer, a desktop computer, a tablet computer, a computing system such as system illustrated in FIG. 12, etc.) may obtain the image 600 (which may depict an environment where a vehicle may have been located or may have travelled). For example, the computing device may retrieve or read the image 600 from a data store (e.g., a memory, a hard disk drive, a flash drive, etc.). The image 600 may have been previously generated and/or captured by one or more sensors on a vehicle. For example, the image 600 may have been previously generated and/or captured by a camera (e.g., a video camera, a digital camera, a camera sensor, etc.) on the vehicle.

In one embodiment, the image includes line indicators 610 (illustrated as curved lines in FIG. 6A). The line indicators 610 may represent lanes, lane lines, curbs, boundaries, lane dividers/divides, lane markings, etc., that are located in the environment (depicted in the image 600). For example, the line indicators may be lane markers/lines on a road or street. The line indicators 610 may include curved and/or straight lines. For example, a line indicator 610 may be a curved line, a straight line, and/or a line that includes curved and straight portions. Although four line indicators 610 are illustrated in FIG. 6A, any number of line indicators may be included in other embodiments.

In one embodiment, the line indicators 610 may be based on user input provided by a user. For example, a user may view or inspect the image 600 and may indicate, draw, place, position, etc., the line indicators 610 in the image 600. The line indicators 610 may be added to the image 600 such that the line indicators 610 are part of the image 600. For example, the user may edit the original image captured, generated, etc., by the camera to add the line indicators 610 to the image 600. The line indicators 610 may also be included in metadata associated with the image 600.

In another embodiment, the line indicators 610 may be generated by a computing device. The computing device may analyze the image and may indicate, draw, place, position, etc., the line indicators 610 in the image 600. For example, a neural network may be used to analyze the image 600 and add the line indicators 610 to the image 600. The line indicators 610 may be part of the image 600 and/or may be included in metadata associated with the image 600.

In one embodiment, the image 600 may be included in the training data for a neural network. For example, the image 600 may be included in the training data for a neural network that determines vanishing points in images. The actual vanishing point of the image 600 may have been previously determined. This allows a computing device to determine whether the vanishing point determined by the neural network (e.g., a detected vanishing point or a determined vanishing point) is accurate (e.g., is the same as or within a threshold distance of the actual vanishing point).

In one embodiment, a computing device may determine (e.g., generate, compute, obtain, calculate, etc.) line segments 620 based on the line indicators 610. For example, the computing device may analyze the line indicators 610 and may determine one line segment 620 for each line indicator 610. A line segment 620 may be a longest straight line portion of a respective line indicator 610. A line segment 620 may also be a longest straight line that may be fitted onto or matched to a portion of a respective line indicator.

In one embodiment, a line segment 620 may also be the longest straight line within an upper bound/height and a lower bound/height for the image 600. The line segment 620 may also be the longest straight line that is closer and/or closest to the lower bound/height for the image 600. For example, the computing device may analyze portions of a line indicator 610 that are between the heights Y1 and Y8 and determining whether a straight line can be fitted onto the portion of the line indicator 610 (between Y1 and Y8). If a straight line can be fitted onto the portion of the line indicator between Y1 and Y8, the computing device may use the straight line for determining a vanishing point, as discussed in more detail below. If a straight line cannot be fitted onto the portion of the line indicator 610 (between Y1 and Y8), the computing device may analyze other portions of the line indicator 610 until computing device can identify or determine the longest straight line that can be fitted onto a portion of the line indicator 610 and is closer/closest to the bottom of the image or the lower bound/height. For example, the computing device may consecutively analyze the portion of the line indicator 610 between Y2 and Y8, then the portion the line indicator 610 between Y3 and Y8, the portion the line indicator 610 between Y4 and Y8, the portion the line indicator 610 between Y5 and Y8, the portion the line indicator 610 between Y6 and Y8, and the portion the line indicator 610 between Y7 and Y8. The computing device may stop at the first portion (starting from portion Y1-Y8 through portions Y7-Y8) where a straight line may be fitted onto that portion.

In one embodiment, the computing device may determine whether a line segment 620 (e.g., a straight line) may be fitted onto a portion of a line indicator 610 based on a threshold number of points in the line segment 620 and a threshold distance from a respective line indicator 610. For example, the computing device may divide the line indicator 610 into points and/or segments (e.g., a point may be in between two segments). The computing device may determine a straight line between two points on the line indicator 610. The first point may be located at the height Y8 of a line indicator 610. The second point may be located at the current height that is being analyzed (e.g., one of heights Y1 through Y7). The computing device may determine whether a threshold number of points on the straight line are not within a threshold distance of the line indicator 610. For example, the computing device may determine whether there are less than three, five, or some other appropriate number of points on the straight line, which are larger than threshold distance (e.g., larger than five pixels, 10 pixels, or some other appropriate distance) away from the line indicator 610. If there are less than the threshold number of points on the straight line that are not within the threshold distance of the line indicator 610, the computing device may determine that the straight line can be fitted onto the portion of the line indicator 610.

Figure 6B:
FIG. 6B is a diagram illustrating an example image, according to one embodiment.

FIG. 6B is a diagram illustrating an example image 600, according to one embodiment. The image 600 may depict an environment where vehicles, such as autonomous driving vehicles and non-autonomous vehicles, may be located and/or travelling. The image 600 may have been previously generated and/or captured by one or more sensors on a vehicle. The image 600 includes line indicators 610 (illustrated as curved lines in FIG. 6B). The line indicators 610 may represent lanes, lane lines, curbs, boundaries, lane dividers/divides, lane markings, etc., that are located in the environment (depicted in the image 600). The line indicators 610 may be based on user input provided by a user, as discussed above. The line indicators 610 may also be generated (e.g., automatically generated) by a computing device, as discussed above. The line indicators 610 may be included as part of the image 600 and/or may be included in metadata associated with the image 600.

As discussed above, a neural network may be used to analyze images and identify features in images. A neural network may be trained prior to deploying and/or using the neural network. For example, training data (e.g., training images) may be used to train a neural network. The training data may include features of interest that were previously identified (e.g., previously identified by a user or a computing device).

As discussed above, a computing device may determine (e.g., generate, compute, obtain, calculate, etc.) line segments 620 based on the line indicators 610. A line segment 620 may also be the longest straight line within an upper bound/height and a lower bound/height for the image 600. The line segment 620 may also be the longest straight line that is closer and/or closest to the lower bound/height for the image 600.

In one embodiment, the computing device may determine a vanishing point 630 in the image 600 based on the line segments 620. The computing device may determining the vanishing point in the image 600 by determining lines 640 based on the line segments 620. Each line 640 may be associated with or may correspond to respective line segment 620. The computing device may determine (e.g., compute, generate, identify, etc.) the lines 640 by extending each line segment 620 towards a top or upper portion of the image 600. For example, the computing device may determine a line 640 that starts from a point in a respective line segment 620 (e.g., at some point between the first and second end of the line segment 620), that is parallel to the line segment 620, and extends towards the top of the image.

In one embodiment, the computing device may determine the vanishing point 630 by determine where at least two of the lines 640 intersect in the image 600. For example, all of the lines 640 may intersect at a point or location in the image 600. If all of the lines 640 intersect at a single point or location in the image 600, the point or location of intersection (for all of the lines 640) may be the vanishing point. In another example, the lines 640 may not all intersect at a single point or location in the image. As illustrated in FIG. 6B, the lines 640 do not all intersect at a single point or location in the image 600. When the lines 640 do not all intersect at a single point or location in the image 600, the computing device may use various techniques, methods, algorithms, etc., to determine the vanishing point 630. For example, the computing device may determine (e.g., identify, calculate, etc.) the point or location in the image 600 that is closest to all of the lines 640. In another example, the computing device may determine a point or location where the most lines 640 intersect (e.g., where four out of five lines intersect).

In one embodiment, the computing device may update the image 600 or metadata associated with the image 600 to indicate a location of the vanishing point within the image 600. For example, the computing device may edit the image to add an indicator (e.g., an X or cross shape, a dot, a small square, a small diamond, etc.) to the image 600 to indicate where the vanishing point 630 is within the image 600. In another example, the computing device may generate and/or edit metadata associated with the image 600 to indicate the location of the vanishing point 630. For example, the computing device may add a lateral location (or X-coordinate) and a longitudinal location (or Y-coordinate) to the metadata to indicate the vanishing point 630. In another example, the computing device may add relative a lateral location (or relative X-coordinate) and a relative longitudinal location (or relative Y-coordinate) to the metadata to indicate vanishing point 630.

As discussed above, the image 600 may be included in training data that may be used to train a neural network to identifying vanishing points in images. For example, the image 600 may be provided to a neural network and the neural network may determine and/or detect a vanishing point. The location/position of the vanishing point determined by the neural network may be compared with the location/position of the vanishing point 630. The computing device may compare the difference between the actual vanishing point of the image and the vanishing point determined by the neural network. The computing device may adjust the weights in the neural network based on the difference between the actual vanishing point of the image and the vanishing point determined by the neural network.

The methods, operations, functions, actions, etc., described in FIGS. 6A and 6B may be repeated on all of the images that may be in the training data for the neural network. For example, a computing device may obtain multiple images (e.g., hundreds, thousands, or some other appropriate number of images) that depict additional environments where an ADV may be located and/or travelling. Each of the images may include additional line indicators that represent lanes in the additional environments. The computing device may determine additional line segments for the additional line indicators, as discussed above. The computing device may also determine vanishing points for the images based on the additional line segments.

As discussed above, it may be difficult for a user to indicate the vanishing points in images that are used as training data for a neural network. For example, a user may not be able to precisely click on or indicate the vanishing point in an image. In addition, it may be difficult for a user to determine the location of the vanishing point in the image.

Because the images are used to train the neural network (e.g., used as training data) it may be important and/or useful to indicate accurate vanishing points in the images so that the neural network can be trained to accurately determine vanishing points. More accurate training data may allow the neural network to generate more accurate results (e.g., more accurate vanishing points). Because it may be difficult for a user to accurately identify and/or indicate vanishing points within image, determining the vanishing points based on the lane indicators may allow a computing device to determine the vanishing points more accurately, quickly and/or efficiently.

Figure 7:
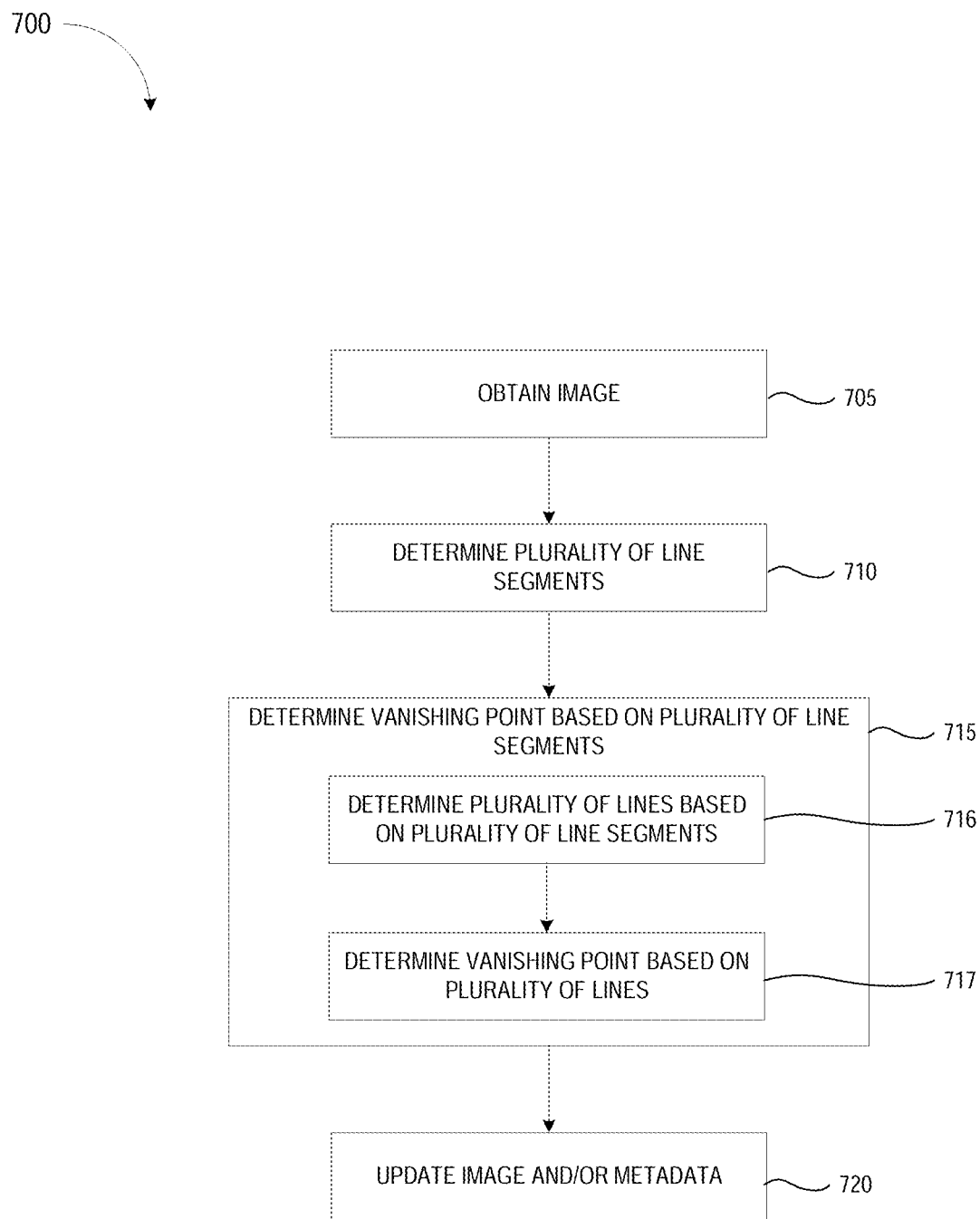
FIG. 7 is a flowchart illustrating an example process for determining a vanishing point in an image.

FIG. 7 is a flowchart illustrating an example process 700 for determining a vanishing point in an image. Process 700 may be performed by processing logic which may include software, hardware, or a combination thereof. Process 700 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 700 may be performed by a processing device, an AI accelerator, a computing device, an ADV, a planning module (e.g., planning module 305 illustrated in FIG. 3B), etc.

At block 705, the process 700 obtains an image that may depict an environment where an ADV may be located. As discussed above, the image may be part of training data for a neural network. The image includes a plurality of line indicators that represent one or more lanes in the environment. At block 710, the process 700 determines a plurality of line segments based on the plurality of line indicators. For example, the process 700 may identifying a longest straight line that is closer/closest to the bottom of the image for each of the line indicators, as discussed above. At block 715, the process 700 may determine a vanishing point based on the plurality of line segments. For example, at block 716, the process 700 may determine a plurality of lines based on the plurality of line segments (as illustrated in FIG. 6B). At block 717, the process 700 may determine a vanishing point based on the plurality of lines (as illustrated in FIG. 6B). At block 720, the process 700 may update the image and/or metadata associated with the image, to indicate the location of the vanishing point.

Figure 8:
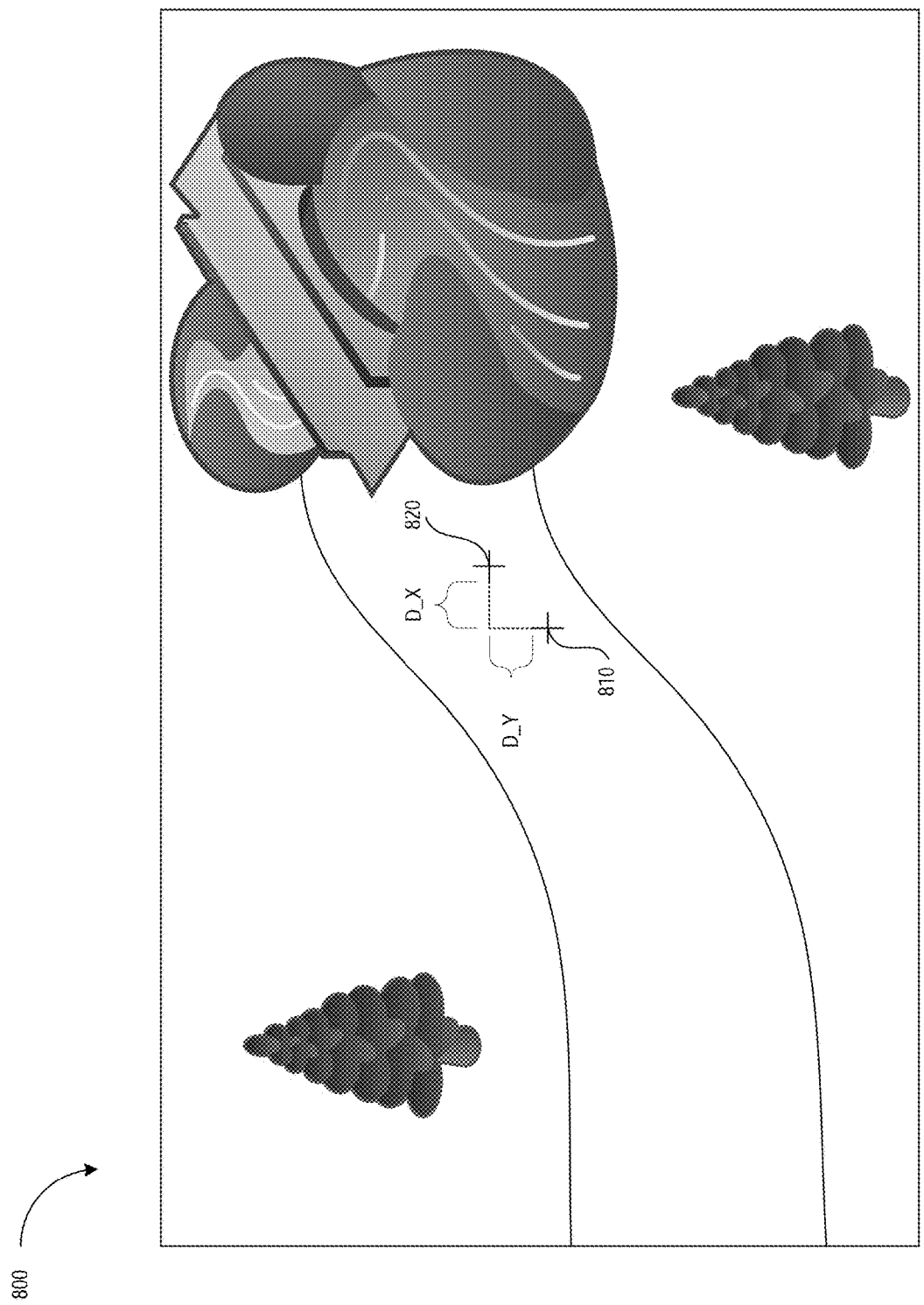
FIG. 8 is a diagram illustrating an example image, according to one embodiment.

FIG. 8 is a diagram illustrating an example image 800, according to one embodiment. The image 800 may depict an environment where an ADV may be located and/or travelling. In one embodiment, the image 800 may be training data that may be used to train a neural network. In another embodiment, the image 800 may be an image that was generated and/or captured by one or more sensors of an ADV. The image 800 may be processed and/or analyzed by a neural network (e.g., neural network 500). For example, the image 800 may be used to train a neural network. In another example, the image 800 may be analyzed by a neural network that may be used by an ADV while the ADV is in operation (e.g., while the ADV is driving or travelling through the environment).

In one embodiment, the ADV may obtain the image 800. For example, one or more cameras for the ADV may capture and/or generate the image 800. The image 800 maybe provided to a neural network that may be used to determine vanishing points in images. For example, the image 800 may be provided as an input to the neural network. The vanishing point 820 may be represented using various formats. For example, using an X-Y coordinate (e.g., Cartesian coordinate) system, the vanishing point may be represented as an X-Y coordinate. In one embodiment, as illustrated in FIG. 8, the neural network may represent the vanishing point as a relative distance to the center 810 of the image 800. The relative distance may include a relative lateral distance $D\_X$ to the center 810 and a relative longitudinal distance $D\_Y$ to the center 810.

In one embodiment, the autonomous vehicle may calibrate one or more sensors of the autonomous driving vehicle based on the vanishing point 820. For example, the sensor system 115 illustrated in FIG. 2 may calibrate one or more cameras 211, based on the vanishing point 820. A sensor, such as a camera, may become uncalibrated due to the operation of the ADV. For example, driving over rough terrain may cause the camera to be uncalibrated because the orientation of the camera (e.g., the roll, pitch, and yaw of the camera) may be changed during the operation of the ADV. In addition, as the ADV turns, moves upwards/uphill, moves downwards/downhill, etc., the orientation of the camera relative to the ADV may also be changed. Thus, it may be useful to recalibrate the camera (e.g., sensors), when this occurs to allow the camera to better capture sensor data (e.g., images, image data) for the ADV.

In one embodiment, the ADV may determine whether one or more sensors should be calibrated based on the vanishing point 820. For example, if a camera (e.g., a sensor) is properly calibrated, the vanishing point 820 detected by the neural network may be located at the center 810 of the image 800 or within a threshold distance of the center 810 of the image 800. The ADV may determine how far away the vanishing point 820 is from the center 810 of the image 800. For example, the ADV may determine the relative lateral distance (e.g., $D\_X$) and the relative longitudinal distance (e.g., $D\_Y$) of the vanishing point 820 from the center 810 of the image 800 (e.g., how far the vanishing point 820 is away from the center 810 of the image 800 in a lateral direction or along the X-axis, and how far the vanishing point 820 is away from the center 810 of the image 800 in a longitudinal direction or along the Y-axis). If the vanishing point 820 is within a threshold distance of the center 810 of the image 800, the ADV may refrain from calibrating the camera (e.g., may not calibrate the camera). For example, the camera may not need to be calibrated because the vanishing point 820 is within a threshold distance of the center 810 of the image 800. If the vanishing point 820 is not within a threshold distance of the center 810 of the image 800, the ADV may calibrate the camera.

In one embodiment, the neural network may be trained to represent the vanishing point 820 as a relative distance to the center 810 of the image 800 (e.g., represent the vanishing point 820 as a coordinate ($D\_X, D\_Y$)). As discussed above, a neural network may be trained using training data (e.g., training images). The neural network may process and/or analyze the training data and may generate vanishing points represented as relative distances to the centers of the training images. The locations/positions of the vanishing points determined by the neural network may be compared with the actual locations/positions of the vanishing points in the training images. If the locations/positions of the vanishing points determined by the neural networks are not within a threshold relative distance the locations/positions of the actual vanishing points, the weights in the neural network may be adjusted. The actual vanishing points may be determined based on the methods, operations, actions, functions, etc., described in FIGS. 6A, 6B, and 7. The neural network may continuously reprocesses/reanalyze the training images, determine whether the vanishing points determined by the neural networks are within a threshold relative distance the locations/positions of the actual vanishing points, and readjust one or more weights, until the vanishing points determined by the neural networks are within a threshold relative distance the locations/positions of the actual vanishing points in the training images. Because the relative distances to the center of the images are used to determine whether the neural network has been trained, the neural network may be configured to represent the vanishing points in images using the relative distances to the center of the images.

In one embodiment, using the relative distance (e.g., $D\_X$ and $D\_Y$) to the center of the image may reduce the problem and/or solution space that the neural network may process. For example, if an X-Y coordinate is used to represent the vanishing point then number of possible locations where the vanishing point may be located may span the entire length and width (e.g., the length and width in pixels) of the image 800. However, if the relative distance to the center of the image is used to represent the vanishing point, then the problem space for the neural network to process may be reduced (e.g., may be reduced by half). In addition, using the relative distance to the center of the image may allow the neural network to focus more on the locations around the center of the image. This may reduce the amount of time for a neural network to process/analyze an image.

Figure 9:
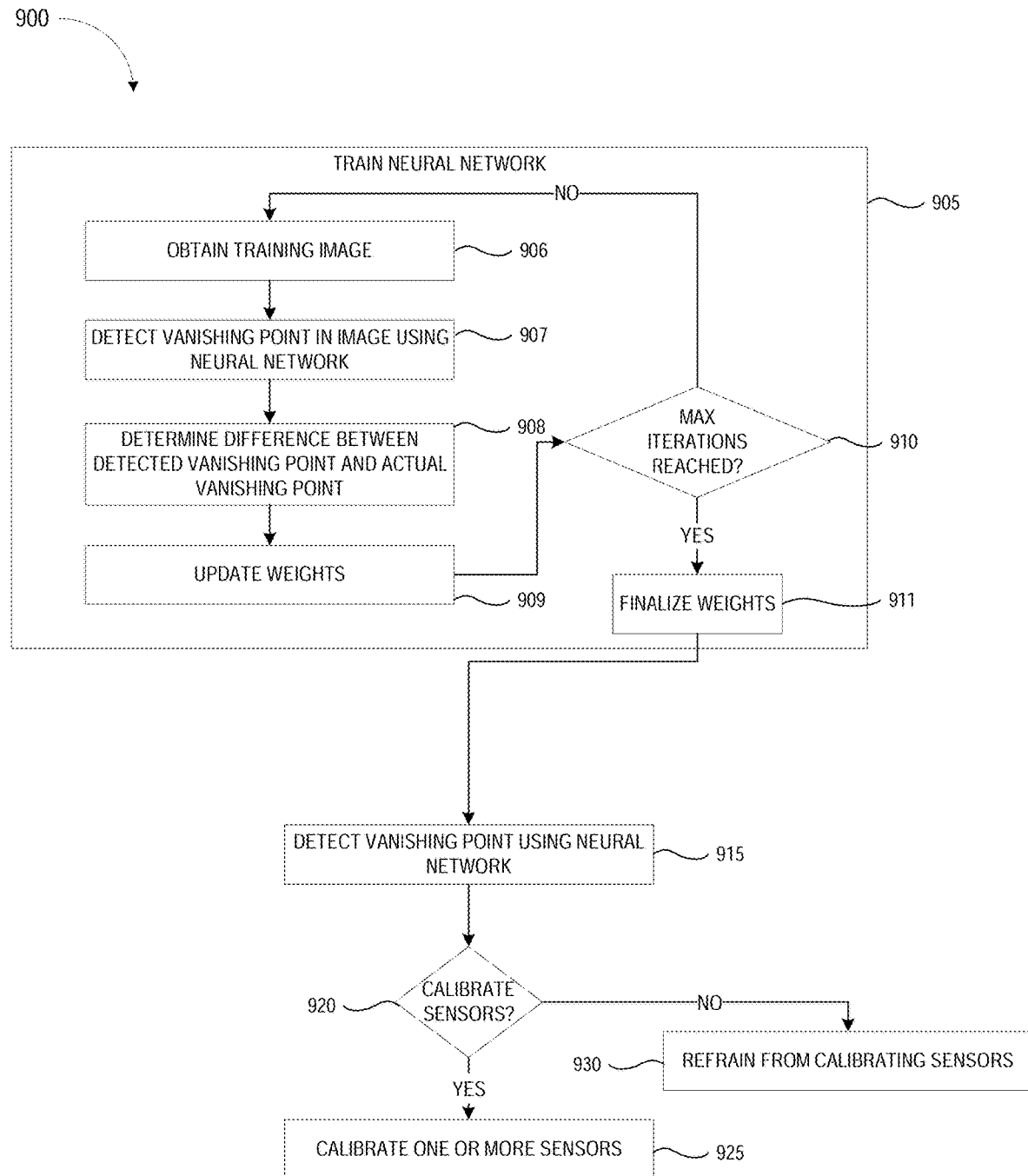
FIG. 9 is a flowchart illustrating an example process for detecting a vanishing point in an image, according to one embodiment

FIG. 9 is a flowchart illustrating an example process 900 for detecting a vanishing point in an image, according to one embodiment. Process 900 may be performed by processing logic which may include software, hardware, or a combination thereof. Process 900 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 900 may be performed by a processing device, an AI accelerator, a computing device, an ADV, a planning module (e.g., planning module 305 illustrated in FIG. 3B), etc.

At block 905, the process 900 may optionally train a neural network. For example, the process 900 may obtain a training image (e.g., training data) at block 906. The process 900 may detect a vanishing point in the training image at block 907. As discussed above, the vanishing points may be represented using a relative distance to the centers of the images (e.g., using $D\_X$ and $D\_Y$ illustrated in FIG. 8). At block 908, the process 900 may determine the difference between the detected vanishing point and the actual vanishing point of the training image. For example, process 900 may determine whether the lateral and/or longitudinal distances between the detected vanishing point and the actual vanishing point. The actual vanishing point may have been previously determined by a neural network based on line indicators in the image, as discussed above in FIGS. 6A, 6B, and 7. At block 909, the process 900 may update, adjust, modify, etc., the weights of the neural network. At block 910, the process 900 may determine whether maximum number of iterations has been reached. The maximum number of iterations may be the number of times that a neural network should be trained using one or more training images (e.g., the maximum number of times the neural network should process one or more training images). For example, the maximum number of iterations may indicate the total number of times the neural network should repeat the process of determining the vanishing point in an image and updating the weights of the neural network (based on the different between the detected vanishing point and the actual vanishing point). Examples of the maximum number of iterations may include 100 times, 5000 times, or some other appropriate number of times. If the max number of iterations has not been reached, the process 900 may proceed to block 906. If the max number of iterations has been reached, the process 900 may finalize (e.g., set) the weights for the neural network at block 911.

At block 915, the process 900 may determine the vanishing point for the image using the neural network. For example, the process 900 may receive images generated by and/or captured by a camera (e.g., a sensor) to the neural network and the neural network may determine a vanishing point of the image. The vanishing point may be represented using a relative distance to the center of the image (e.g., D_X and D_Y as discussed above). At block 920, the process 900 may determine whether to calibrate one or more sensors of the ADV. For example, the process 900 may determine whether the vanishing point is within a threshold distance of the center of the image. If the one or more sensors should be calibrated, the process 900 may calibrate the one or more sensors at block 925. If the one or more sensors should not be calibrated, the process 900 may refrain from calibrating the sensors at block 930.

Figure 10:
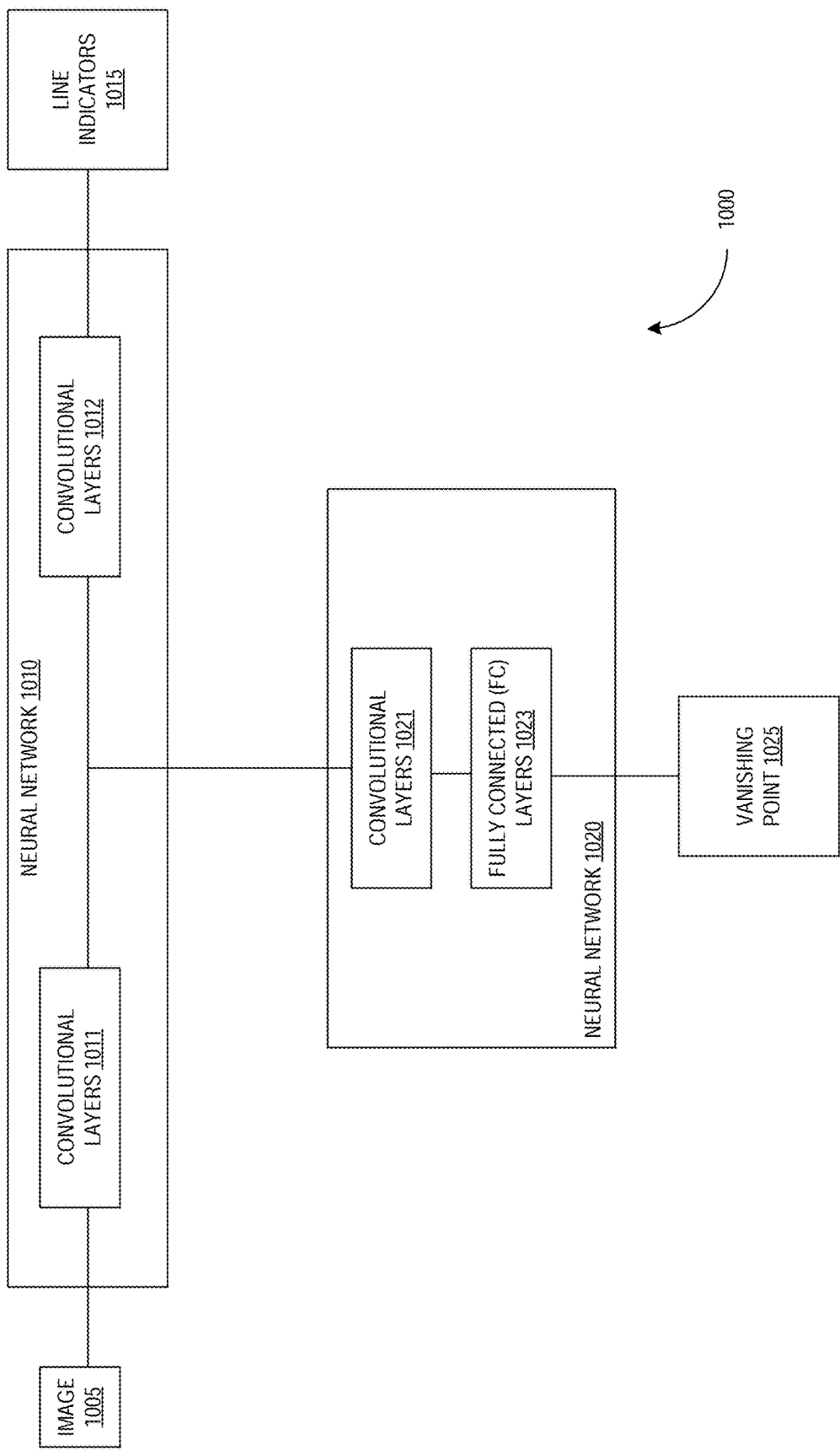
FIG. 10 is a block diagram illustrating an example neural network system, according to one embodiment.

FIG. 10 is a block diagram illustrating an example neural network system 1000, according to one embodiment. In one embodiment, an ADV may use the neural network system 1000 to determine lanes (e.g., detect, identify, compute, etc., line indicators that represent lane lines) in images that depict environments where the ADV is currently travelling and/or located. The ADV may also use the neural network system 1000 to determine vanishing points in images that depict environments where the ADV is currently travelling and/or located. As illustrated in FIG. 10, the neural network system 1000 includes a neural network 1010 and a neural network 1020. As discussed above, neural networks 1010 and 1020 may be executed, run on, etc., processing devices such as graphics processing units (GPUs) and/or other types of artificial intelligence accelerators.

In one embodiment, the neural network 1010 may detect lanes that may be in the image 1005 (which depicts an environment where the ADV is currently travelling and/or located). The neural network 1010 may analyze and/or process the image 1005 and may output one or more lane line indicators 1015. For example, the neural network 1010 may generate one or more line indicators 1015, as discussed above in FIG. 6A. The neural network 1010 may include convolutional layers 1011 and convolutional layers 1012. The neural network 1010 may include other layers, such as an input layer, an output layer, pooling layers, additional convolutional layers, etc., as discussed above.

In one embodiment, the neural network 1010 may be an encoder-decoder based convolutional neural network (CNN). For example, the convolutional layers 1011 may be referred to as an encoder and the convolutional layers 1012 may be referred to as a decoder. The convolutional layers 1011 may perform down-sampling functions and/or operations on input data, such as the image 1005. The convolutional layers 1011 may be used to identify features in the image 1005. For example, the convolutional layers 1011 may generate feature maps using one or more convolutional filters. The convolutional layers 1012 may perform up-sampling functions and/or operations on the feature maps generated by the convolutional layers 1011. For example, the convolutional layers 1012 may use the feature maps to reconstruct the input with features that of interest, such as line indicators (which indicate lane lines on a road, street, etc.).

In one embodiment, the neural network 1020 may determine a vanishing point in the image 1005 (which depicts an environment where the ADV is currently travelling and/or located). For example, the neural network 1020 may determine a vanishing point 1025 for the image 1005. As discussed above, the vanishing point may be represented using a relative distance (e.g., D_X, D_Y) from the center of the image 1005. The neural network 1020 may be convolutional neural network (CNN). The neural network 1020 may include convolutional layers 1021 and a fully connected layers 1023. The neural network 1020 may include other layers, such as an input layer, an output layer, pooling layers, additional convolutional layers, etc., as discussed above.

As illustrated in FIG. 10, the neural network 1020 is communicatively and/or operatively coupled to the neural network 1010. For example, the input of the convolutional layers 1021 of the neural network 1020 is coupled to the output of the convolutional layers 1011 of the neural network 1010. In one embodiment, the neural network 1020 may not use the image 1005 as an input. The neural network 1020 may use the feature maps generated by the convolutional layers 1011 to determine the vanishing point 1025. For example, the convolutional layers 1021 may use the feature maps generated by the convolutional layers 1011 to determine the vanishing point 1025. As discussed above, the line indicators may be used to determine a vanishing point for the image. Thus, the feature maps generated by the convolutional layers 1011 (which may be multi-dimensional (e.g., 2D or 3D) vectors, tensors, etc.) may include data and/or information that may represent the line indicators, which may be used to determining the vanishing point 1025. The convolutional layers 1021 may also generate features maps that correspond to sub-portions or local portions of the image 1005. The fully connected layers 1023 may take the feature maps from the convolutional layers 1021 to translate and/or combine the local feature maps to determine a global summary of the local feature maps. The global summary may allow the neural network 1020 to identify the vanishing point within the whole image 1005, rather than a local portion of the image 1005.

In one embodiment, the neural network system 1000 may obtain an image 1005 (which may depict an environment where the ADV is currently located or travelling). For example, the neural network system 1000 may receive the image 1005 from a camera of the ADV or may read the image 1005 from a data store (e.g., a memory). The neural network system 1000 may use the neural network 1010 to determine one or more line indicators (which may represent one or more lanes in the environment) based on the image 1005. For example, the neural network 1010 may process and/or analyze the image 1005, as discussed above. The neural network system 1000 may also use the neural network 1020 to determining a vanishing point within the image 1005. For example, the neural network 1020 may be coupled to the neural network 1010 and may use the feature maps generated by the neural network 1010 (e.g., generated by convolutional layers 1011) to determine the vanishing point 1025. The neural network system 1000 may determine the one or more line indicators 1015 and the vanishing point 1025 simultaneously. For example, the neural network 1010 may perform operations to determine the one or more line indicators 1015 at the same time that the neural network 1020 is performing operations to determine the vanishing point 1025.

In one embodiment, the ADV (e.g., the sensor system 115 of the ADV as illustrated in FIG. 2) may determine whether one or more sensors should be calibrated based on the vanishing point 1025. For example, if a camera (e.g., a sensor) is properly calibrated, the vanishing point 1025 detected by the neural network may be located at the center of the image 1005 or within a threshold distance of the center of the image 1005. If the vanishing point 1025 is within a threshold distance of the center of the image 1005, the ADV may refrain from calibrating the camera (e.g., may not calibrate the camera). For example, the camera may not need to be calibrated because the vanishing point 1025 is within a threshold distance of the center of the image 1005. If the vanishing point 1025 is not within a threshold distance of the center of the image 1005, the ADV may calibrate the camera.

In one embodiment, the ADV (e.g., the perception and planning system 110, the planning module 305, as illustrated in FIGS. 3A and 3B) may determine a path for the ADV through the environment based on the line indicators 1015. For example, ADV may identify a path along the lanes indicated by the line indicators 1015. The ADV may control the ADV based on the path. For example, the perception and planning system 110 (illustrated in FIGS. 3A and 3B) may cause the ADV to drive along the path.

As discussed above, a neural network may be trained before the neural network is deployed and/or used. For example, the neural network 1010 and the neural network 1020 may be trained using training data (e.g., training images) before the neural network 1010 and the neural network 1020 are used by the ADV. The neural network system 1000 may allow for more flexible and/or different training strategies when training the neural network 1010 and the neural network 1020. In one embodiment, the neural network 1010 may be trained separately from the neural network 1020. For example, the neural network 1010 and the neural network 1020 may be trained at different points in time (e.g., the neural network 1010 may be trained first and the neural network 1020 may be trained second). In another example, the neural network 1010 and the neural network 1020 may be trained using different training data. For example, a first set of training images may be used to train the neural network 1010 and a second set of training images may be used to train the neural network 1020. In another embodiment, the neural network 1010 and the neural network 1020 may be trained simultaneously. For example, the neural network 1010 and the neural network 1020 may be trained at overlapping time periods (e.g., the neural network 1010 may be trained while the neural network 1020 is also being trained). In another example, the neural network 1010 and the neural network 1020 may be trained using the same training data. For example, the same set of training images may be used to train the neural network 1010 and the neural network 1020. By allowing different training strategies to be used, the neural network system 1000 allows users to use the training strategy that provides better accuracy and/or better inferences. For example, an ADV may be able to determining whether training the neural network 1010 and neural network 1020 separately will allow the neural networks 1010 and 1020 to generate more accurate results than training the neural networks 1010 and 1020 simultaneously.

In addition, the neural network system 1000 may allow an existing neural network to be used in conjunction with a newer neural network. For example, the neural network 1010 may be a pre-existing neural network that the ADV uses to detect line indicators. Because the second neural network 1020 may also use the same line indicators to detect vanishing points, the second neural network can be coupled and/or integrated with the first neural network 1010. This allows the second neural network 1020 to work in conjunction with the existing neural network 1010.

Figure 11:
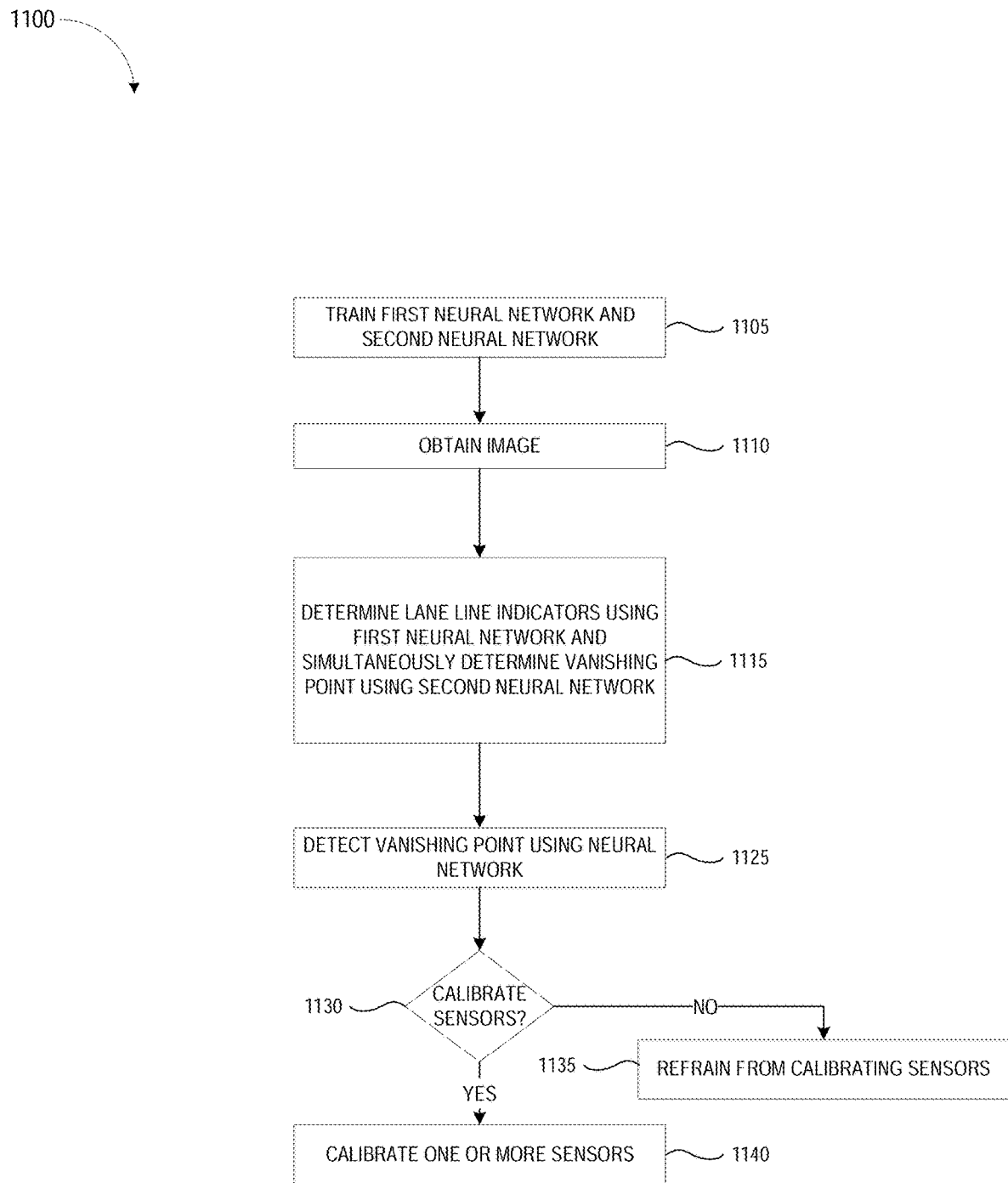
FIG. 11 is a flowchart illustrating an example process for detecting a vanishing point in an image, according to one embodiment

FIG. 11 is a flowchart illustrating an example method for detecting a vanishing point. Process 1100 may be performed by processing logic which may include software, hardware, or a combination thereof. Process 1100 may be performed by processing logic that may comprise hardware (e.g., circuitry, dedicated logic, programmable logic, a processor, a processing device, a central processing unit (CPU), a system-on-chip (SoC), etc.), software (e.g., instructions running/executing on a processing device), firmware (e.g., microcode), or a combination thereof. In some embodiments, process 1100 may be performed by a processing device, an AI accelerator, a computing device, an ADV, a planning module (e.g., planning module 305 illustrated in FIG. 3B), etc.

At block 1105, the process 1100 may optionally train a first neural network and a second neural network. As discussed above, the first neural network and the second neural network may be trained separately or simultaneously. Also as discussed above, the first neural network may be used to determine (e.g., detect, identify, generate, compute, etc.) line indicators that may indicate lane lines in an image. The second neural network may be used to determine a vanishing point in the image. The first neural network may be coupled to the second neural network as illustrated in FIG. 10. At block 1110 may obtain an image. For example, the image may be generated and/or captured by a camera (e.g., a sensor) of an ADV. The process 1100 may receive the image from the camera or may read the image from a data storage (e.g., a memory, a hard disk drive, a flash drive, etc.). At block 1115, the process 1100 may determine one or more lane line indicators for the image using the first neural network. The process 1100 may also simultaneously determine a vanishing point for the image using the second neural network. For example, both the first neural network and second neural network may be operating at the same time (e.g., there is at least some overlap in the time when the first neural network is determining the line indicators and in the time when the second neural network is determining the vanishing point). The second neural network may use feature maps generated by the first neural network, as discussed above. The vanishing point may be represented using a relative distance to the center of the image (e.g., D_X and D_Y as discussed above). At block 1130, the process 1100 may determine whether to calibrate one or more sensors of the ADV. For example, the process 1100 may determine whether the vanishing point is within a threshold distance of the center of the image. If the one or more sensors should be calibrated, the process 1100 may calibrate the one or more sensors at block 1140. If the one or more sensors should not be calibrated, the process 1100 may refrain from calibrating the sensors at block 1135.

Note that some or all of the components as shown and described herein may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

FIG. 12 is a block diagram illustrating an example of a data processing system which may be used with one embodiment of the disclosure. For example, system 1500 may represent any of data processing systems described above performing any of the processes or methods described above, such as, for example, perception and planning system 110 or any of servers 103-104 of FIG. 1, and path optimizer 309 of FIG. 3A. System 1500 can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

Note also that system 1500 is intended to show a high level view of many components of the computer system. However, it is to be understood that additional components may be present in certain implementations and furthermore, different arrangement of the components shown may occur in other implementations. System 1500 may represent a desktop, a laptop, a tablet, a server, a mobile phone, a media player, a personal digital assistant (PDA), a Smartwatch, a personal communicator, a gaming device, a network router or hub, a wireless access point (AP) or repeater, a set-top box, or a combination thereof. Further, while only a single machine or system is illustrated, the term "machine" or "system" shall also be taken to include any collection of machines or systems that individually or jointly execute a set (or multiple sets) of instructions to perform any one or more of the methodologies discussed herein.

In one embodiment, system 1500 includes processor 1501, memory 1503, and devices 1505-1508 connected via a bus or an interconnect 1510. Processor 1501 may represent a single processor or multiple processors with a single processor core or multiple processor cores included therein. Processor 1501 may represent one or more general-purpose processors such as a microprocessor, a central processing unit (CPU), or the like. More particularly, processor 1501 may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1501 may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions.

Processor 1501, which may be a low power multi-core processor socket such as an ultra-low voltage processor, may act as a main processing unit and central hub for communication with the various components of the system. Such processor can be implemented as a system on chip (SoC). Processor 1501 is configured to execute instructions for performing the operations and steps discussed herein. System 1500 may further include a graphics interface that communicates with optional graphics subsystem 1504, which may include a display controller, a graphics processor, and/or a display device.

Processor 1501 may communicate with memory 1503, which in one embodiment can be implemented via multiple memory devices to provide for a given amount of system memory. Memory 1503 may include one or more volatile storage (or memory) devices such as random access memory (RAM), dynamic RAM (DRAM), synchronous DRAM (SDRAM), static RAM (SRAM), or other types of storage devices. Memory 1503 may store information including sequences of instructions that are executed by processor 1501, or any other device. For example, executable code and/or data of a variety of operating systems, device drivers, firmware (e.g., input output basic system or BIOS), and/or applications can be loaded in memory 1503 and executed by processor 1501. An operating system can be any kind of operating systems, such as, for example, Robot Operating System (ROS), Windows® operating system from Microsoft®, Mac OS/iOS® from Apple, Android® from Google®, LINUX, UNIX, or other real-time or embedded operating systems.

System 1500 may further include IO devices such as devices 1505-1508, including network interface device(s) 1505, optional input device(s) 1506, and other optional IO device(s) 1507. Network interface device 1505 may include a wireless transceiver and/or a network interface card (NIC). The wireless transceiver may be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, or a combination thereof. The NIC may be an Ethernet card.

Input device(s) 1506 may include a mouse, a touch pad, a touch sensitive screen (which may be integrated with display device 1504), a pointer device such as a stylus, and/or a keyboard (e.g., physical keyboard or a virtual keyboard displayed as part of a touch sensitive screen). For example, input device 1506 may include a touch screen controller coupled to a touch screen. The touch screen and touch screen controller can, for example, detect contact and movement or break thereof using any of a plurality of touch sensitivity technologies, including but not limited to capacitive, resistive, infrared, and surface acoustic wave technologies, as well as other proximity sensor arrays or other elements for determining one or more points of contact with the touch screen.

IO devices 1507 may include an audio device. An audio device may include a speaker and/or a microphone to facilitate voice-enabled functions, such as voice recognition, voice replication, digital recording, and/or telephony functions. Other IO devices 1507 may further include universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Devices 1507 may further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors may be coupled to interconnect 1510 via a sensor hub (not shown), while other devices such as a keyboard or thermal sensor may be controlled by an embedded controller (not shown), dependent upon the specific configuration or design of system 1500.

To provide for persistent storage of information such as data, applications, one or more operating systems and so forth, a mass storage (not shown) may also couple to processor 1501. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on re-initiation of system activities. Also a flash device may be coupled to processor 1501, e.g., via a serial peripheral interface (SPI). This flash device may provide for non-volatile storage of system software, including BIOS as well as other firmware of the system.

Storage device 1508 may include computer-accessible storage medium 1509 (also known as a machine-readable storage medium or a computer-readable medium) on which is stored one or more sets of instructions or software (e.g., module, unit, and/or logic 1528) embodying any one or more of the methodologies or functions described herein. Processing module/unit/logic 1528 may represent any of the components described above, such as, for example, planning module 305, control module 306, and path optimizer 309. Processing module/unit/logic 1528 may also reside, completely or at least partially, within memory 1503 and/or within processor 1501 during execution thereof by data processing system 1500, memory 1503 and processor 1501 also constituting machine-accessible storage media. Processing module/unit/logic 1528 may further be transmitted or received over a network via network interface device 1505.

Computer-readable storage medium 1509 may also be used to store the some software functionalities described above persistently. While computer-readable storage medium 1509 is shown in an exemplary embodiment to be a single medium, the term "computer-readable storage medium" should be taken to include a single medium or multiple media (e.g., a centralized or distributed database, and/or associated caches and servers) that store the one or more sets of instructions. The terms "computer-readable storage medium" shall also be taken to include any medium that is capable of storing or encoding a set of instructions for execution by the machine and that cause the machine to perform any one or more of the methodologies of the present disclosure. The term "computer-readable storage medium" shall accordingly be taken to include, but not be limited to, solid-state memories, and optical and magnetic media, or any other non-transitory machine-readable medium.

Processing module/unit/logic 1528, components and other features described herein can be implemented as discrete hardware components or integrated in the functionality of hardware components such as ASICS, FPGAs, DSPs or similar devices. In addition, processing module/unit/logic 1528 can be implemented as firmware or functional circuitry within hardware devices. Further, processing module/unit/logic 1528 can be implemented in any combination hardware devices and software components.

Note that while system 1500 is illustrated with various components of a data processing system, it is not intended to represent any particular architecture or manner of interconnecting the components; as such details are not germane to embodiments of the present disclosure. It will also be appreciated that network computers, handheld computers, mobile phones, servers, and/or other data processing systems which have fewer components or perhaps more components may also be used with embodiments of the disclosure.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilizing terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A method, comprising:
obtaining an image depicting an environment where an autonomous driving vehicle (ADV) is located;

determining a vanishing point within the image using a neural network, wherein the vanishing point is represented by the neural network as a relative distance to a center of the image;
calibrating one or more sensors of the autonomous driving vehicle based on the vanishing point; and
training the neural network to represent the vanishing point as a relative distance to the center of the image, including
obtaining a training image depicting an environment where the autonomous driving vehicle (ADV) may be located;
determining a second vanishing point for the training image, wherein the second vanishing point is represented using a first relative distance;
determining a difference between the second vanishing point and an actual vanishing point of the training image;
adjusting weights of the neural network based on the difference between the second vanishing point and the actual vanishing point of the training image.

2. The method of claim 1, wherein the relative distance to the center of the image comprises a relative lateral distance to the center of the image and a relative longitudinal distance to the center of the image.

3. The method of claim 1, further comprising:
determining whether the one or more sensors should be calibrated based on the vanishing point.

4. The method of claim 3, wherein the one or more sensors are calibrated in response to determined that the one or more sensors should be calibrated.

5. The method of claim 3, further comprising:
refraining from calibrating the one or more sensors in response to determine that the one or more sensors should not be calibrated.

6. The method of claim 1, wherein the image is received from one or more cameras of the autonomous driving vehicle.

7. A non-transitory machine-readable medium having instructions stored therein, which when executed by a processor, cause the processor to perform operations, the operations comprising:
obtaining an image depicting an environment where an autonomous driving vehicle (ADV) is located;
determining a vanishing point within the image using a neural network, wherein the vanishing point is represented by the neural network as a relative distance to a center of the image;
calibrating one or more sensors of the autonomous driving vehicle based on the vanishing point; and
training the neural network to represent the vanishing point as a relative distance to the center of the image, including
obtaining a training image depicting an environment where the autonomous driving vehicle (ADV) may be located;
determining a second vanishing point for the training image, wherein the second vanishing point is represented using a first relative distance;
determining a difference between the second vanishing point and an actual vanishing point of the training image;
adjusting weights of the neural network based on the difference between the second vanishing point and the actual vanishing point of the training image.

8. The non-transitory machine-readable medium of claim 7, wherein the relative distance to the center of the image comprises a relative lateral distance to the center of the image and a relative longitudinal distance to the center of the image.

9. The non-transitory machine-readable medium of claim 7, wherein the operations further comprise:
determining whether the one or more sensors should be calibrated based on the vanishing point.

10. The non-transitory machine-readable medium of claim 9, wherein the one or more sensors are calibrated in response to determined that the one or more sensors should be calibrated.

11. The non-transitory machine-readable medium of claim 9, wherein the operations further comprise:
refraining from calibrating the one or more sensors in response to determine that the one or more sensors should not be calibrated.

12. The non-transitory machine-readable medium of claim 7, wherein the image is received from one or more cameras of the autonomous driving vehicle.

13. A data processing system, comprising:
a processor; and
a memory coupled to the processor to store instructions, which when executed by the processor, cause the processor to perform operations, the operations including:
obtaining an image depicting an environment where an autonomous driving vehicle (ADV) is located;
determining a vanishing point within the image using a neural network, wherein the vanishing point is represented by the neural network as a relative distance to a center of the image;
calibrating one or more sensors of the autonomous driving vehicle based on the vanishing point; and
training the neural network to represent the vanishing point as a relative distance to the center of the image, including
obtaining a training image depicting an environment where the autonomous driving vehicle (ADV) may be located;
determining a second vanishing point for the training image, wherein the second vanishing point is represented using a first relative distance;
determining a difference between the second vanishing point and an actual vanishing point of the training image;
adjusting weights of the neural network based on the difference between the second vanishing point and the actual vanishing point of the training image.

14. The data processing system of claim 13, wherein the relative distance to the center of the image comprises a relative lateral distance to the center of the image and a relative longitudinal distance to the center of the image.

15. The system of claim 13, wherein the operations further include:
determining whether the one or more sensors should be calibrated based on the vanishing point.

16. The system of claim 15, wherein the one or more sensors are calibrated in response to determined that the one or more sensors should be calibrated.

17. The system of claim 15, wherein the operations further include:
refraining from calibrating the one or more sensors in response to determine that the one or more sensors should not be calibrated.

18. The system of claim 13, wherein the image is received from one or more cameras of the autonomous driving vehicle.

\* \* \* \* \*